US008749432B2

(12) United States Patent
Watanabe et al.

(10) Patent No.: US 8,749,432 B2
(45) Date of Patent: Jun. 10, 2014

(54) SATELLITE SIGNAL DETERMINATION APPARATUS

(75) Inventors: Yusuke Watanabe, Anjo (JP); Tatsuya Iwase, Aichi-gun (JP); Noriyoshi Suzuki, Nagoya (JP)

(73) Assignee: DENSO CORPORATION, Kariya (JP)

( * ) Notice: Subject to any disclaimer, the term of this patent is extended or adjusted under 35 U.S.C. 154(b) by 416 days.

(21) Appl. No.: 13/285,061

(22) Filed: Oct. 31, 2011

(65) Prior Publication Data

US 2012/0105271 A1 May 3, 2012

(30) Foreign Application Priority Data

Nov. 2, 2010 (JP) ................................. 2010-246150

(51) Int. Cl.
*G01S 19/28* (2010.01)
(52) U.S. Cl.
USPC .................................................. 342/357.67
(58) Field of Classification Search
USPC .................................................. 342/357.67
See application file for complete search history.

(56) References Cited

U.S. PATENT DOCUMENTS

| 5,589,836 A | 12/1996 | Noetzel |
| 8,223,071 B2 * | 7/2012 | Lee et al. .................. 342/357.67 |
| 2007/0262900 A1 | 11/2007 | Haverkamp et al. |

FOREIGN PATENT DOCUMENTS

| JP | 09-304502 A | 11/1997 |
| WO | WO 2006/132003 | 12/2006 |

OTHER PUBLICATIONS

Office Action mailed Aug. 6, 2013 issued in corresponding JP patent application No. 2010-246150 (and English translation).
Takeyasu Sakai, "Practical use programming for GPS," Tokyo Denki University Press, 2007, pp. 39-41. (Concise English Translation attached and discussed on p. 7 of the specification).
"Global Positioning System: Signals, Measurements, and Performance by Pratap Misra," translated into Japanese as "Detail explanation of GPS basic concept, positioning principle and signal, and receiver" of Seiyou library, 2004, GPS Society, Japane Institute of Navigation. pp. 113-114. (Concise English Translation attached and discussed on p. 8 of the specification).
Weidong Ding, "Integration of MEMS INS with GPS Carrier Phase Derived Velocity: A New Approach," *Proceedings of ION*, ION GNSS 20th International Technical Meeting of the Satellite Division, 25-28, Sep. 2007, pp. 2085-2093. (Discussed on p. 22 of the specification).

* cited by examiner

*Primary Examiner* — Harry Liu
(74) *Attorney, Agent, or Firm* — Posz Law Group, PLC

(57) ABSTRACT

A vehicle direction estimation section estimates an absolute direction of a heading direction of a vehicle based on GPS information and vehicle information. A satellite direction estimation section estimates an absolute direction of a target satellite of several satellites for positioning based on corresponding GPS information, and estimates a relative direction of the target satellite with respect to the heading direction based on the estimated absolute direction of the heading direction and the estimated absolute direction of the target satellite. A shield determination section determines a shielded state of the target satellite by determining whether a signal strength of a satellite signal from the target satellite is greater than a threshold value relative to a target partition of several partitions into which a three-dimensional sphere with respect to the heading direction is divided, the target partition which the calculated relative direction of the target satellite belongs to.

9 Claims, 12 Drawing Sheets

DIVISION NUMBER : 48

DIVISION NUMBER : 24

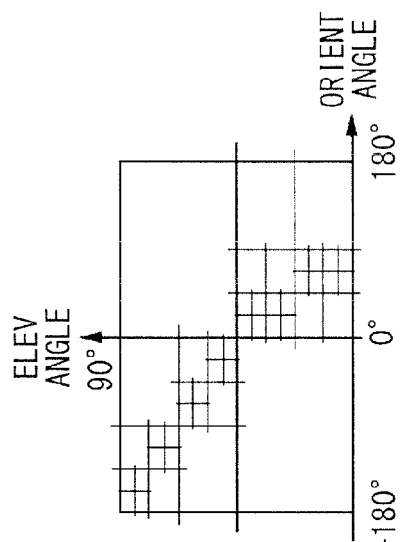
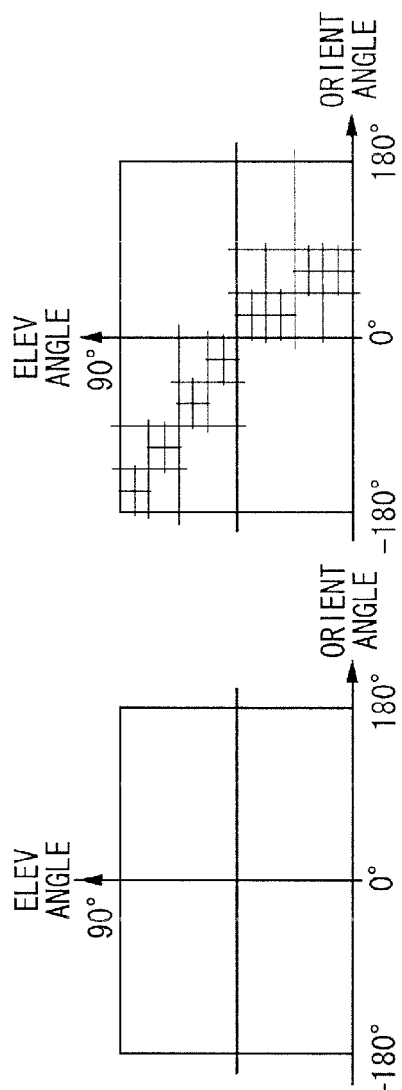
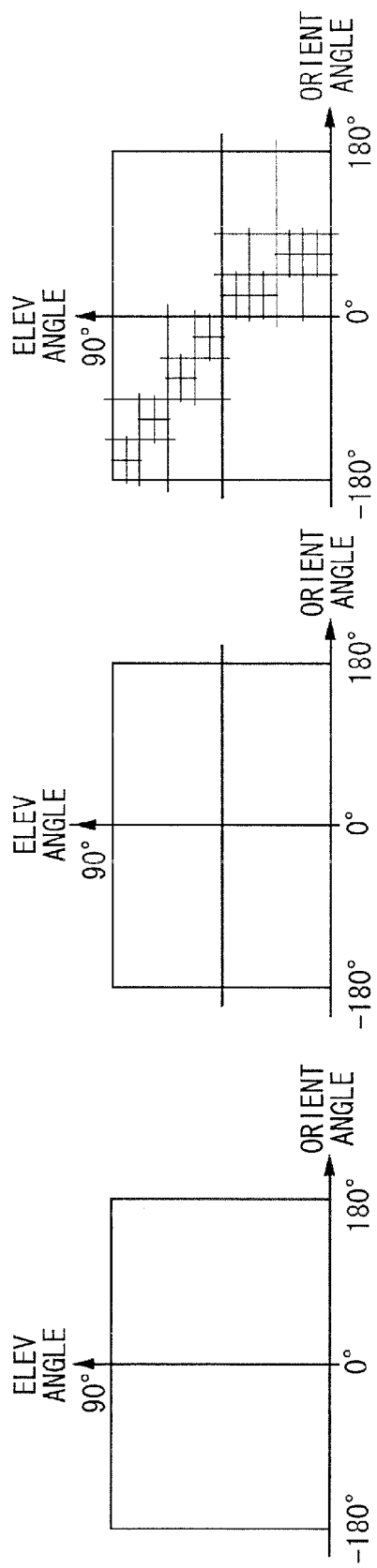
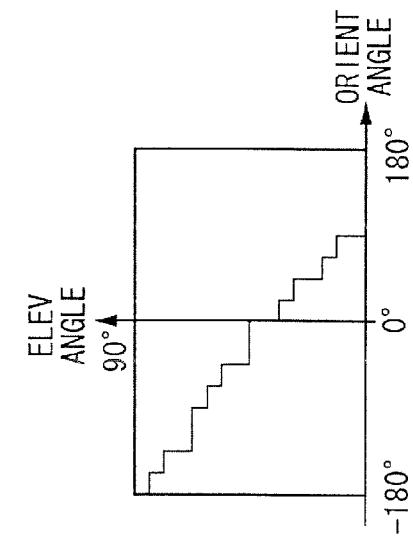
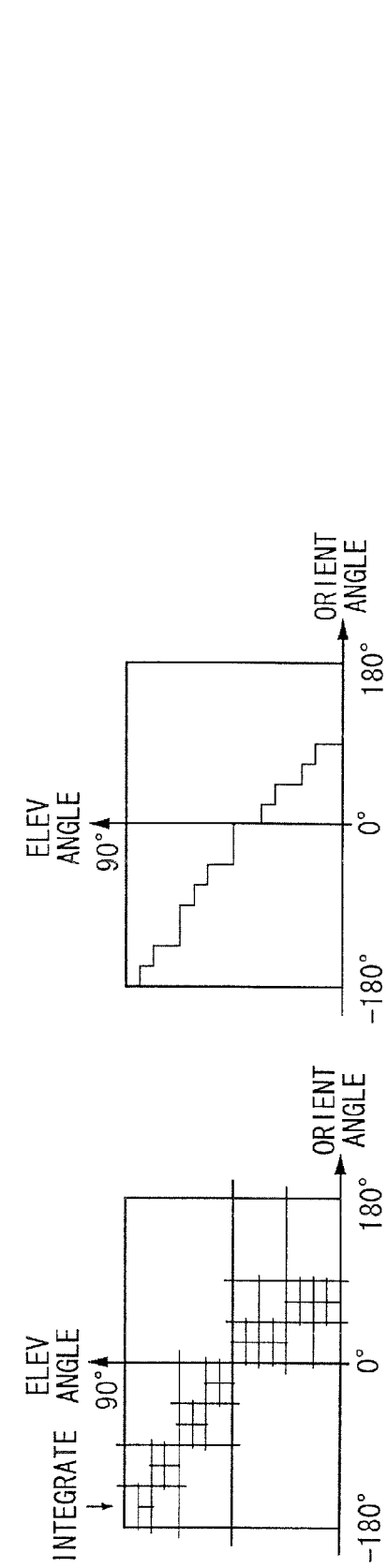

SATELLITE SIGNAL DETERMINATION APPARATUS

CROSS REFERENCE TO RELATED APPLICATION

The present application is based on and incorporates herein by reference Japanese Patent Application No. 2010-246150 filed on Nov. 2, 2010.

FIELD OF THE INVENTION

The present invention relates to a satellite signal determination apparatus which determines a shielded state of a satellite for positioning based on a satellite signal from the satellite.

BACKGROUND OF THE INVENTION

[Patent document 1] WO-2006-132003 A1

There is known a GPS positioning amendment method which amends a measuring position of a mobile station by determining a satellite signal undergoing an influence of the multipass with an easy and accurate method (see Patent document 1). In this method, a reference station transmits data for position amendment and a reception strength of a satellite signal to a mobile station such as a vehicle; the mobile station compares the reception strength in the reference station with the reception strength in the mobile station with respect to a satellite signal of each satellite. When the difference in such comparison is greater than a predetermined threshold value, the satellite signal of the satellite is removed from the satellite signals for positioning.

However, the technology in Patent document 1 assumes that a GPS receiver is installed outdoors while naturally not considering a signal attenuation due to a vehicle body. In contrast, when the GPS receiver is installed inside of the vehicle or vehicle body, a signal may decline because of a roof or a pillar of the vehicle; thus, the use of the threshold value of the signal strength (S/N) in the outdoors results in not determining the shielded state of the positioning satellite with sufficient accuracy, posing a problem.

SUMMARY OF THE INVENTION

The present invention is made so as to address the above problem. It is an object of the present invention to provide a satellite signal determination apparatus which can determine a shielded state of a satellite for positioning with sufficient accuracy even if a GPS receiver is provided inside of a moving vehicle.

To achieve the above object, according to a first aspect of the present invention, a satellite signal determination apparatus for a moving vehicle is provided as follows. A GPS receiver is provided inside of the vehicle to receive satellite signals transmitted from a plurality of satellites for positioning. A vehicle direction estimation section is included to estimate an absolute direction of a heading direction of the vehicle based on (i) GPS information outputted from the GPS receiver based on the satellite signals transmitted from the plurality of satellites, or (ii) vehicle information of the vehicle detected by a detection section. A satellite direction estimation section is included to estimate an absolute direction of an existing position of a target satellite that is one of the plurality of satellites based on the GPS information outputted from the GPS receiver based on the satellite signal from the target satellite. A relative direction calculation section is included to calculate a relative direction of the target satellite with respect to the heading direction of the vehicle based on (i) the absolute direction of the heading direction of the vehicle estimated by the vehicle direction estimation section, and (ii) the absolute direction of the target satellite estimated by the satellite direction estimation section. A shield determination section is included to determine a shielded state or a non-shielded state of the target satellite by determining whether a signal strength of a satellite signal transmitted from the target satellite is greater than a predetermined threshold value relative to a target partition included in a plurality of partitions into which a three-dimensional sphere with respect to the heading direction of the vehicle is divided, the target partition which the relative direction of the target satellite calculated by the relative direction calculation section belongs to.

Under such a configuration, the determination of the signal strength of the satellite signal from the target satellite is made using the predetermined threshold value of the signal strength relative to the target partition, which the relative direction of the target satellite belongs to. Thus, even if the GPS receiver is provided inside of the vehicle, the shielded state of the target satellite can be determined with sufficient accuracy.

According to a second aspect of the present invention, a method is provided for a satellite signal determination apparatus for a moving vehicle having a computer and a GPS receiver provided inside of the vehicle to receive satellite signals transmitted from a plurality of satellites for positioning, the method executed by the computer. The method includes: estimating an absolute direction of a heading direction of the vehicle based on (i) GPS information outputted from the GPS receiver based on the satellite signals transmitted from the plurality of satellites, or (ii) vehicle information of the vehicle; estimating an absolute direction of an existing position of a target satellite that is one of the plurality of satellites based on the GPS information outputted from the GPS receiver based on the satellite signal from the target satellite; calculating a relative direction of the target satellite with respect to the heading direction of the vehicle based on (i) the estimated absolute direction of the heading direction of the vehicle, and (ii) the estimated absolute direction of the target satellite; and determining a shielded state of the target satellite by determining whether a signal strength of a satellite signal transmitted from the target satellite is greater than a predetermined threshold value relative to a target partition included in a plurality of partitions into which a three-dimensional sphere with respect to the heading direction of the vehicle is divided, the target partition which the calculated relative direction of the target satellite belongs to.

According to another aspect of the present invention, a program product stored in a non-transitory computer readable storage medium comprising instructions for execution by a computer included in the satellite signal determination apparatus according to the first aspect. The instructions causes the computer to function as: the vehicle direction estimation section; the satellite direction estimation section; the relative direction calculation section; and the shield determination section, wherein all of which are included in the satellite signal determination apparatus according to the first aspect.

According to yet another aspect of the present invention, a non-transitory computer readable storage medium comprising instructions for execution by a computer, the instructions including the method according to the second aspect, which is computer-implemented.

BRIEF DESCRIPTION OF THE DRAWINGS

The above and other objects, features, and advantages of the present invention will become more apparent from the following detailed description made with reference to the accompanying drawings. In the drawings:

FIGS. 12A to 12E are diagrams for explaining an optimal division of dividing a three-dimensional sphere with respect to a vehicle direction;

DETAILED DESCRIPTION OF THE PREFERRED EMBODIMENTS

Hereinafter, with reference to drawings, embodiments of the present invention are explained in detail. The following will explain as an example a case where the present invention is applied to an in-vehicle positioning apparatus which is mounted in a subject vehicle and measures a reception position (i.e., a position of the subject vehicle). It is noted that the in-vehicle positioning apparatus may function as a satellite signal determination apparatus.

First Embodiment

Figure 1:
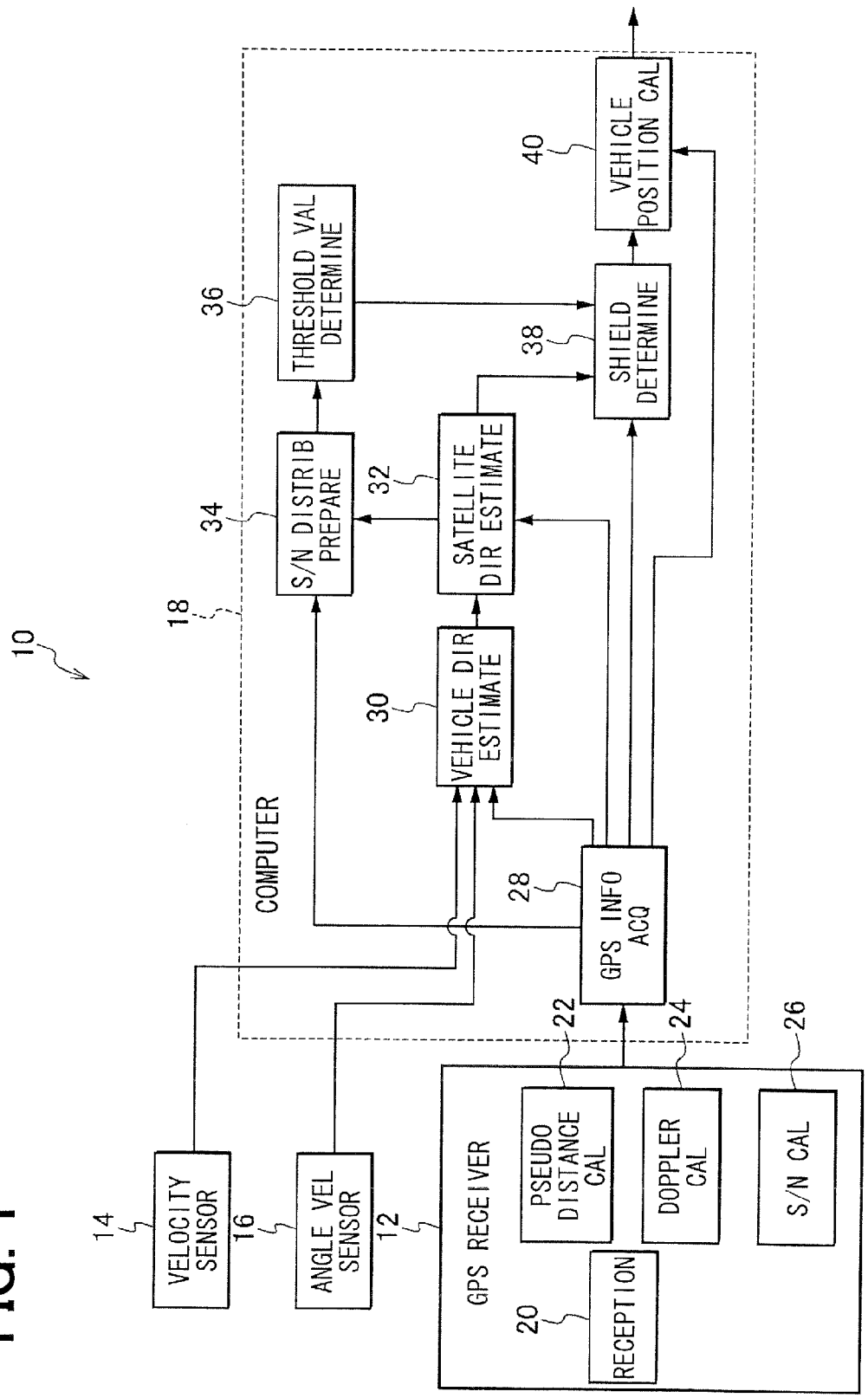
FIG. 1 is a block diagram illustrating an in-vehicle positioning apparatus according to a first embodiment of the present invention.

As illustrated in FIG. 1, an in-vehicle positioning apparatus 10 according to a first embodiment of the present invention includes the following: a GPS receiver 12 which receives as electric waves satellite signals from satellites for positioning (also referred to a positioning satellite or only a satellite) and outputs information on satellite signals; a vehicle velocity sensor 14 which detects a velocity of the subject vehicle; an angular velocity sensor 16 which detects a yaw rate; and a computer 18, which measures a reception position based on output signals from the GPS receiver 12, the vehicle velocity sensor 14, and the angular velocity sensor 16.

The GPS receiver 12 is arranged inside of the subject vehicle or a vehicle body of the subject vehicle. The GPS receiver 12 includes the following: a reception portion 20 to receive a satellite signal transmitted from a positioning satellite; a pseudo distance calculation portion 22 to calculate a pseudo distance (a propagating distance of a signal received from each positioning satellite) between each positioning satellite and a reception position based on satellite signals that are transmitted from all the positioning satellites and received by the reception portion 20 and output the calculated pseudo distance to the computer 18; a Doppler calculation portion 24 which calculates a Doppler shift frequency of the satellite signal from each positioning satellite based on the satellite signals that are transmitted from all the positioning satellites and received by the reception portion 20; and an S/N calculation portion 26 which calculates S/N (signal-to-noise ratio) as a signal strength of the satellite signal based on the satellite signals that are transmitted from all the positioning satellites and received by the reception portion 20. In addition, the GPS receiver 12 further acquires a satellite number of each positioning satellite, a carrier wave phase, and satellite orbit information (Ephemeris data) as GPS information based on the satellite signals that are transmitted from all the positioning satellites and received by the reception portion 20, and outputs them to the computer 18.

The computer 18 contains a CPU and storage devices such as a ROM, RAM, and HDD. The ROM stores a program for achieving an S/N distribution learning process routine and a shield determination process routine; the RAM stores data temporarily.

FIG. 1 illustrates the computer 18 using functional blocks based on the S/N distribution learning process routine and the shield determination process routine. That is, the computer 18 contains the following: a GPS information acquisition section 28 which acquires GPS information from the GPS receiver 12; a vehicle direction estimation section 30 which estimates an absolute direction of a heading direction of the subject vehicle based on the Doppler shift frequency, the vehicle velocity, and the yaw rate which are acquired; a satellite direction estimation section 32 which estimates an absolute direction of an existing position where a positioning satellite exists based on the satellite orbit information outputted from GPS receiver 12, and estimates a relative direction of the existing position where the positioning satellite exits with respect to the heading direction of the subject vehicle based on the estimated absolute direction of the heading direction of the subject vehicle and the estimated absolute direction of the existing position where the satellite exists; an S/N distribution preparation section 34 which accumulates the acquired combinations of the S/Ns of the satellite signals and the relative directions of the positioning satellites and prepares an S/N distribution for each of several partitions which is formed by dividing the three-dimensional sphere with respect to a heading direction of the subject vehicle; and a threshold determination section 36 which determines a threshold value relative to S/N for each partition. Further, the satellite direction estimation section 32 may also function as a relative direction calculation section.

The GPS information acquisition section 28 acquires the GPS information of each positioning satellite such as a pseudo distance, a Doppler shift frequency, S/N, satellite orbit information, a satellite number of the positioning satellite, a carrier wave phase via the GPS receiver 12 and calculates a present position on the orbit of the positioning satellite individually based on the acquired satellite orbit information and present time with respect to each positioning satellite. The calculation method of the satellite position can use a well-known conventional one such as a technology described in Nonpatented document 1; thus, the explanation is omitted herewith.

[Nonpatent document 1]: "Practical use programming for GPS" by Takeyasu SAKAI, Published by Tokyo Denki University Press, 2007

The vehicle direction estimation section 30 calculates a velocity vector of the subject vehicle using the Doppler shift frequencies of the satellite signals of several positioning satellites acquired by the GPS information acquisition section 28 as explained below.

First, according to Expression (1) that indicates a relationship between a Doppler shift frequency and a relative velocity with respect to a positioning satellite, a relative velocity of the subject vehicle with respect to each positioning satellite is calculated from the Doppler shift frequency of the reception signal from each positioning satellite.

[Expression(1)]

$$v_j = -D1_j \cdot C/F_1 \tag{1}$$

Herein, vj is a relative velocity with respect to a positioning satellite j, and D1j is a Doppler shift frequency (Doppler shift quantity) obtained from the positioning satellite j. In addition, C is a velocity of light and F1 is a known L1 frequency of a signal transmitted from the positioning satellite.

Next, the velocity vector (the three-dimensional velocity VXj, VYj, VZj) of each positioning satellite is calculated using the differentiation of Kepler's equation from the time series data of the position coordinate of each positioning satellite calculated by the GPS information acquisition section 28. For example, the velocity vector of each positioning satellite is computable using a conventional method such as a method described in Nonpatent document 2.

[Nonpatent document 2]: "Global Positioning System: Signals, Measurements, and Performance by Pratap Misra", translated into Japanese as "Detail explanation of GPS basic concept, positioning principle and signal, and receiver" of Seiyou library, published in 2004 by the GPS Society, Japan Institute of Navigation In addition, based on the calculated velocity vector (VXj, VYj, VZj) of each positioning satellite and the calculated direction of each positioning satellite ($\theta_j$, $\phi_j$), the velocity Vsj of each positioning satellite in the heading direction of the subject vehicle is calculated. Then, based on the relative velocity vj of the subject vehicle and the velocity Vsj of each positioning satellite j in the heading direction of the subject vehicle with respect to each positioning satellite j, the velocity Vvj of the subject vehicle in the direction of each positioning satellite j is calculated using following Expression (2).

[Expression (2)]

$$v_j = \frac{\partial \rho_j}{\partial t}$$
$$= \frac{\partial \left( \sqrt{(X_j - x)^2 + (Y_j - y)^2 + (Z_j - z)^2} + s \right)}{\partial t}$$
$$= Vs_j - Vv_j + \dot{C}b \tag{2}$$

Herein, vj is a relative velocity of the subject vehicle with respect to the positioning satellite j (a relative velocity with the positioning satellite in the direction of the satellite), and Vsj is a velocity of the positioning satellite j of the heading direction of the subject vehicle. In addition, Vvj is a vehicle velocity of the subject vehicle in the direction of the positioning satellite j, and Cb with a dot is a clock bias drift.

Then, an optimal estimation of the velocity vector of the subject vehicle is executed as follows.

First, when the velocity vector of the subject vehicle is defined as (Vx, Vy, Vz), the relationship with the velocity Vvj of the subject vehicle in the direction of the positioning satellite is illustrated in Expression (3) and Expression (4).

[Expression(3)][Expression(4)]

$$-Vx \cdot \cos\theta_j \cdot \sin\phi_j + Vy \cdot \cos\theta_j \cdot \cos\phi_j + Vz \cdot \sin\theta_j = Vv_j \tag{3}$$

$$v_j = -D1_j \cdot C/F_1 = Vs_j - Vv_j + \dot{C}b$$

$$Vv_j - \dot{C}b = Vs_j + D1_j \cdot C/F_1 \tag{4}$$

The simultaneous equations are indicated as Expression (5), which result from the above expression (3) and expression (4) obtained with respect to each positioning satellite j. The equations have Vx, Vy, Vz, and Cb with a dot as estimates.

[Expression 5]

$$\begin{pmatrix} Vs_0 + D1_0 \cdot C/F1 \\ Vs_1 + D1_1 \cdot C/F1 \\ \vdots \\ Vs_N + D1_N \cdot C/F1 \end{pmatrix} = \begin{pmatrix} -\cos\theta_0\sin\phi_0 & \cos\theta_0\cos\phi_0 & \sin\theta_0 & -1 \\ -\cos\theta_1\sin\phi_1 & \cos\theta_1\cos\phi_1 & \sin\theta_1 & -1 \\ \vdots & \vdots & \vdots & \vdots \\ -\cos\theta_N\sin\phi_N & \cos\theta_N\cos\phi_N & \sin\theta_N & -1 \end{pmatrix} \cdot \begin{pmatrix} Vx \\ Vy \\ Vz \\ \dot{C}b \end{pmatrix} \tag{5}$$

With respect to each combination which consists of four positioning satellites, the above simultaneous equations of Expression (5) are solved. The velocity vector (Vx, Vy, Vz) of the subject vehicle is thus calculated individually. The least square solution of the calculated velocity vector (Vx, Vy, Vz) of the subject vehicle is calculated. The optimum value of the velocity vector of the subject vehicle is estimated.

Then, based on the direction of the estimated velocity vector of the subject vehicle, the absolute direction of the heading direction of the subject vehicle is estimated.

As mentioned above, the vehicle direction estimation section 30 calculates the velocity of the subject vehicle with respect to each satellite direction using the Doppler shift frequency. From the velocity of the subject vehicle with respect to each satellite direction, the absolute direction of the heading direction of the subject vehicle is estimated.

In addition, when the satellite signal is not received by the GPS receiver 12, the vehicle direction estimation section 30 calculates a changed portion of the velocity vector of the subject vehicle using the vehicle velocity detected by the vehicle velocity sensor 14 and the angular velocity detected by the angular velocity sensor 16. In addition, the vehicle direction estimation section 30 calculates the present velocity vector of the subject vehicle based on the velocity vector of the subject vehicle calculated at the latest and the calculated changed portion of the velocity vector of the subject vehicle; then, the vehicle direction estimation section 30 estimates the absolute direction of the heading direction of the subject vehicle based on the direction of the velocity vector of the subject vehicle.

The satellite direction estimation section 32 estimates an absolute direction of an existing position where the positioning satellite exists with respect to each positioning satellite, based on the position coordinate of the positioning satellite calculated by the GPS information acquisition section 28, and the position coordinate of the subject vehicle. The position coordinate of the subject vehicle may use one calculated at the previous time. Alternatively, the position coordinate of the subject vehicle may be obtained based on the pseudo distance of each positioning satellite acquired by the GPS information acquisition section 28.

In addition, the satellite direction estimation section 32 estimates a relative direction of the existing position of the positioning satellite with respect to the heading direction of the subject vehicle (a satellite elevation angle and an angle to the vehicle on a horizontal plane), based on the absolute direction of the existing position, where the satellite exists, and the absolute direction of the heading direction of the subject vehicle estimated by the vehicle direction estimation section 30.

The following explains a principle of the present embodiment.

Figure 2:
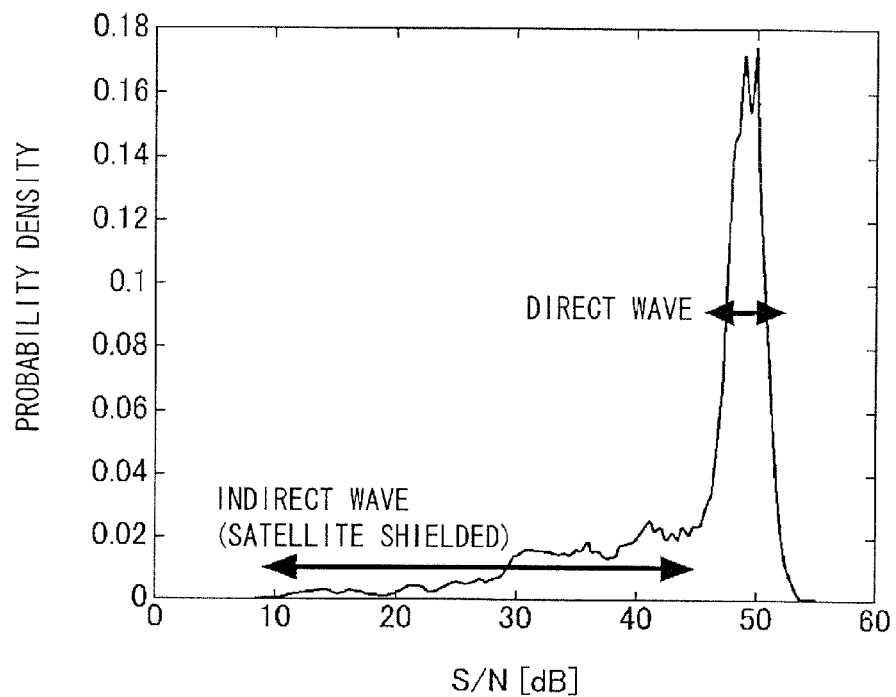
FIG. 2 is a diagram that illustrates an S/N distribution.

First, FIG. 2 illustrates a distribution of the reception signal strength (S/N) (also referred to as an S/N distribution) of one satellite when a vehicle runs urban areas with an antenna of the GPS receiver arranged on the roof of the vehicle. The value of S/N is great when the direct signal reaches the antenna of the GPS receiver from the positioning satellite. In contrast, the value of S/N is small when the satellite signal is shielded by a building and only reflected/diffracted wave reaches the GPS antenna. In addition, S/N of the direct wave is stably observed as a high value; thus, it appears as a portion having a high peak in the S/N distribution. The portion of a low S/N other than the portion including the peak indicates an indirect wave appearing when the positioning satellite is shielded. The S/N of the direct wave and the S/N of the indirect wave are clearly different from each other in the S/N distribution. In a conventional technology, use of this difference enables a determination as to whether the positioning satellite is shielded by a building using a threshold value relative to S/N.

Figure 3:
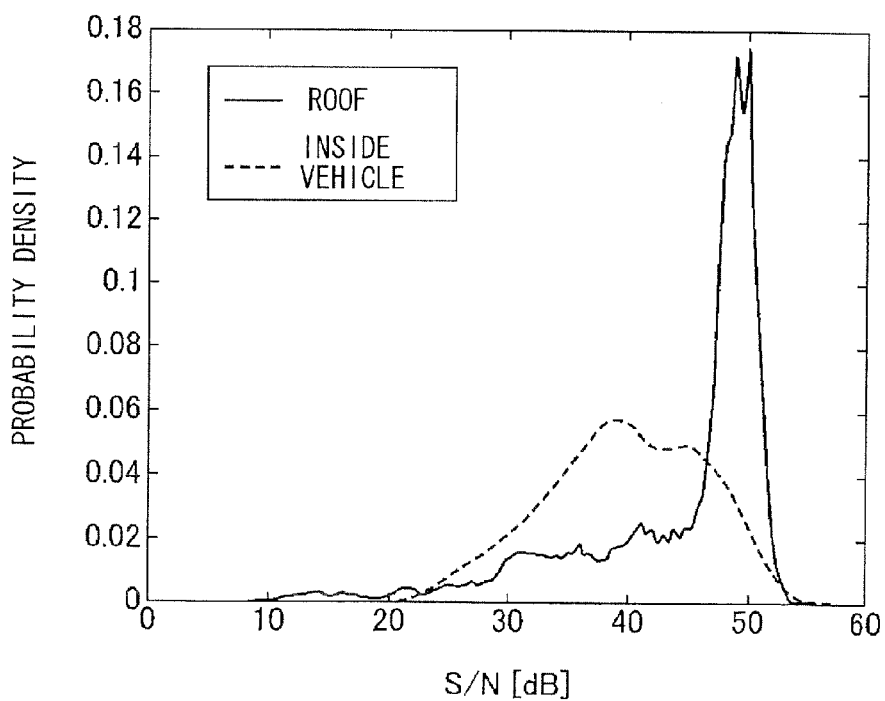
FIG. 3 is a diagram illustrates an S/N distribution when arranging an antenna of a GPS receiver on a roof and inside of a vehicle.

However, an antenna of a GPS receiver for an in-vehicle use is usually arranged inside of a vehicle body or vehicle. FIG. 3 illustrates a comparison of an S/N distribution with respect to an identical satellite between when the antenna of the GPS receiver is installed on the roof and when it is arranged inside of the vehicle. When the antenna of the GPS receiver is installed inside of the vehicle, the S/N distribution does not indicate the portion including the clear peak of the direct wave which appears when the antenna is on the roof. Instead, the S/N distribution does not distinguish the indirect wave and the direct wave from each other.

Thus, when the antenna of the GPS receiver is installed in an inside portion inside of the vehicle, the vehicle body shields a satellite signal. This results in a difficulty in the determination of the shielded state of the positioning satellite using the S/N distribution.

Figure 4:
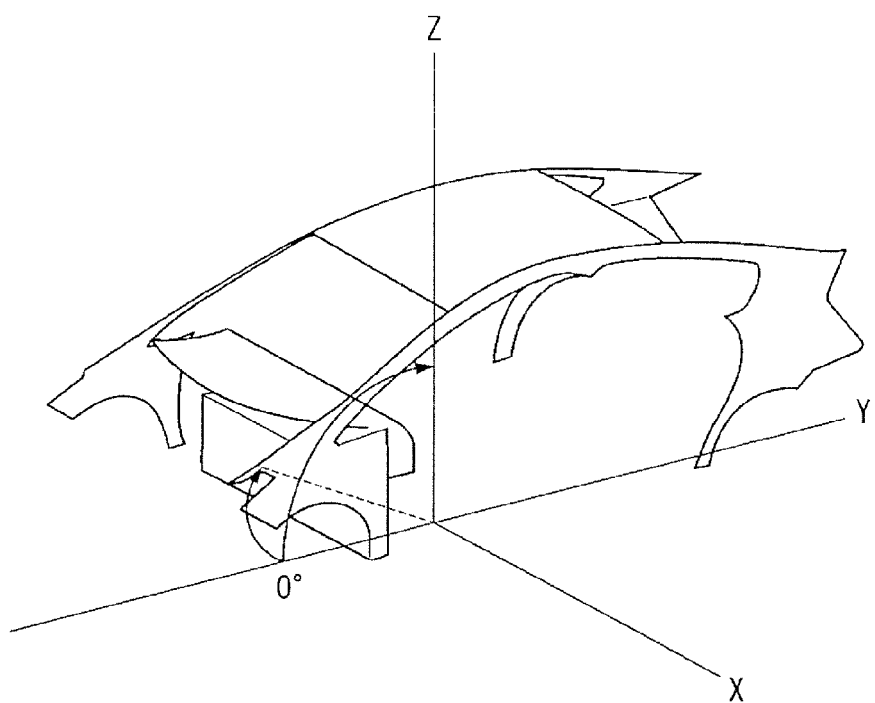
FIG. 4 is a diagram for explaining YZ plane and XZ plane.
Figure 5A:
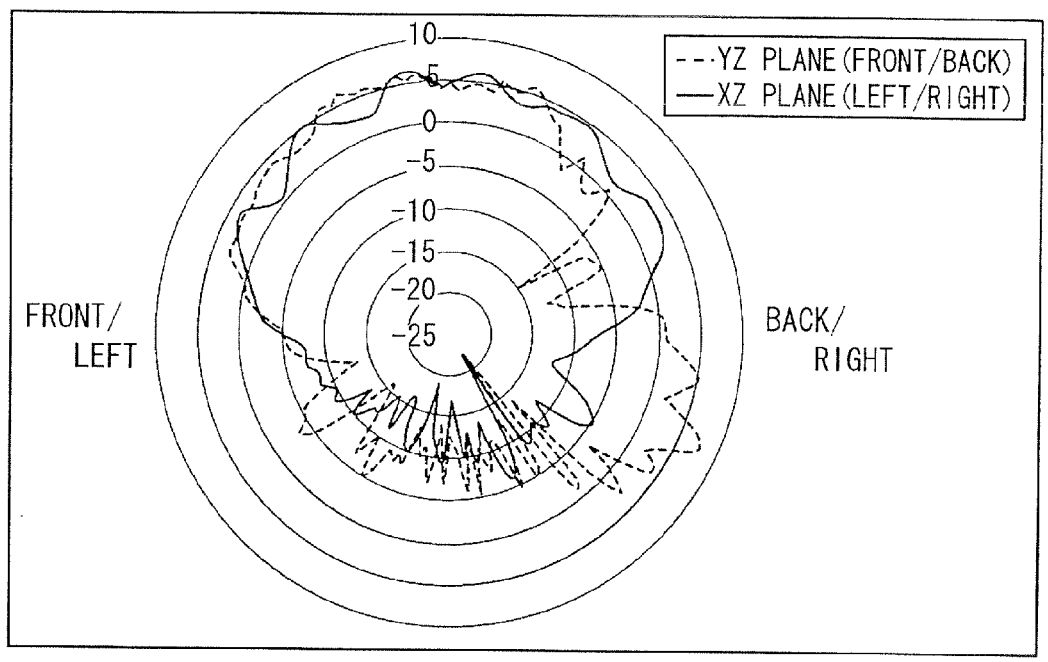
FIG. 5A is a diagram illustrates S/N distributions on YZ plane and XZ plane, respectively.
Figure 5B:
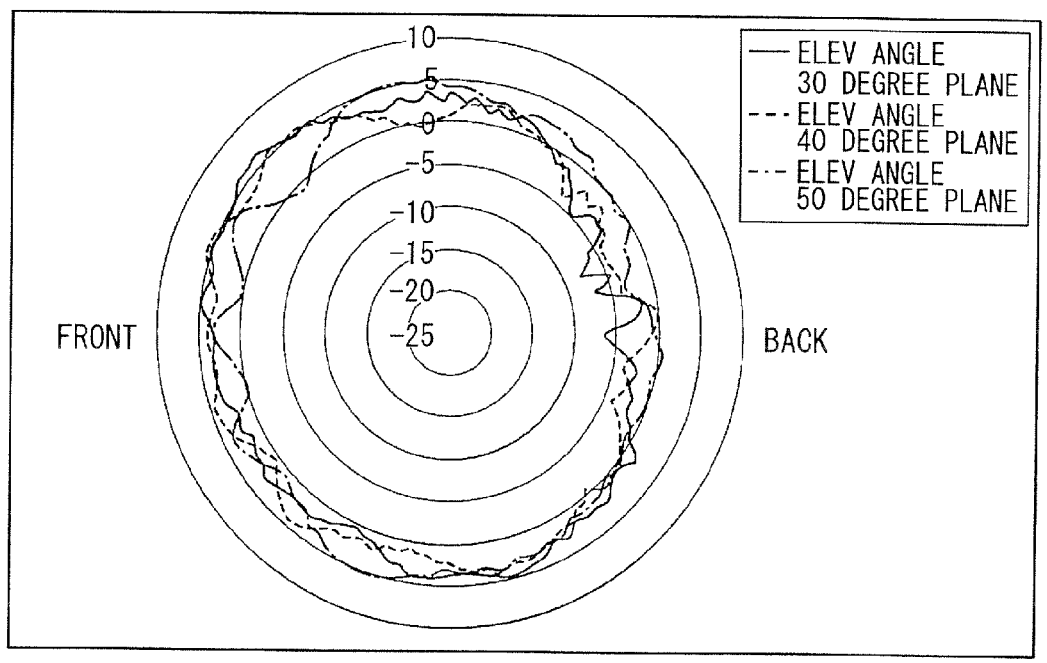
FIG. 5B is a diagram illustrating S/N distributions on planes with elevation angles of 30, 40, and 50 degrees, respectively.

Thus, when the antenna of the GPS receiver is put inside of the vehicle, the portion which includes the peak of the direct wave stops appearing as indicated with a dotted line in FIG. 3. This is because the vehicle body shields the satellite signal, causing the signal strength to decline. In contrast, the window portion of the vehicle body enables a good transmission of the satellite signal, whereas the roof and pillar portion made of metal shield the satellite signal. Thus, the signal shielded condition thus changes depending on portions of the vehicle body, as indicated in FIG. 4. For example, as illustrated in FIG. 5A, the signal strength differs depending on the direction or angle on the YZ plane or XZ plane. In addition, as illustrated in FIG. 5B, the signal strength differs depending on the direction or angle on a plane inclined with a predetermined elevation angle from the horizontal plane.

Figure 6:
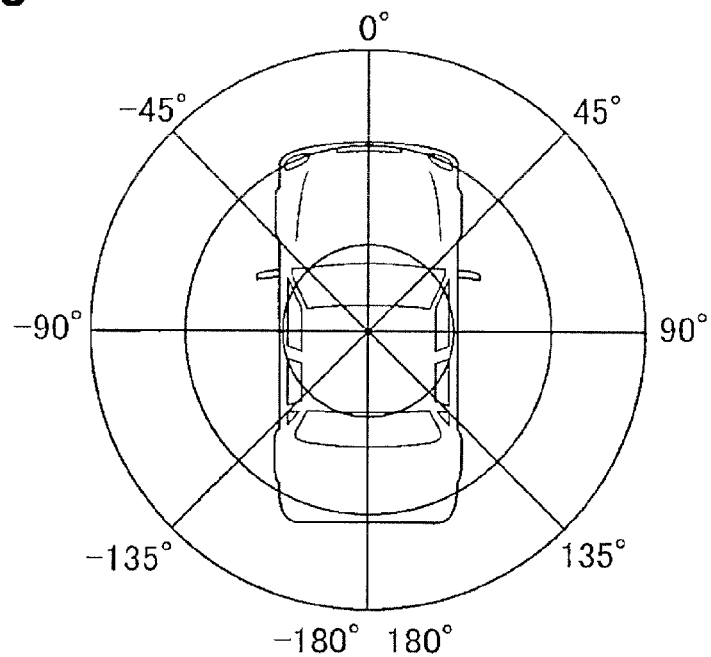
FIG. 6 is a diagram illustrating a division of dividing a three-dimensional sphere with respect to a vehicle heading direction into several partitions.

To that end, in the present embodiment, the S/N distribution preparation section 34 accumulates the combination of the S/N of the satellite signal acquired by the GPS information acquisition section 28, and the relative direction of the positioning satellite estimated by the satellite direction estimation section 32. In addition, as illustrated in FIG. 6, the S/N distribution preparation section 34 divides previously the three-dimensional sphere with respect to the heading direction of the subject vehicle into several partitions. Based on the accumulated combination data, an S/N distribution is prepared for each partition. Thus, the S/N distribution preparation section 34 may function as a division section.

Figure 7:
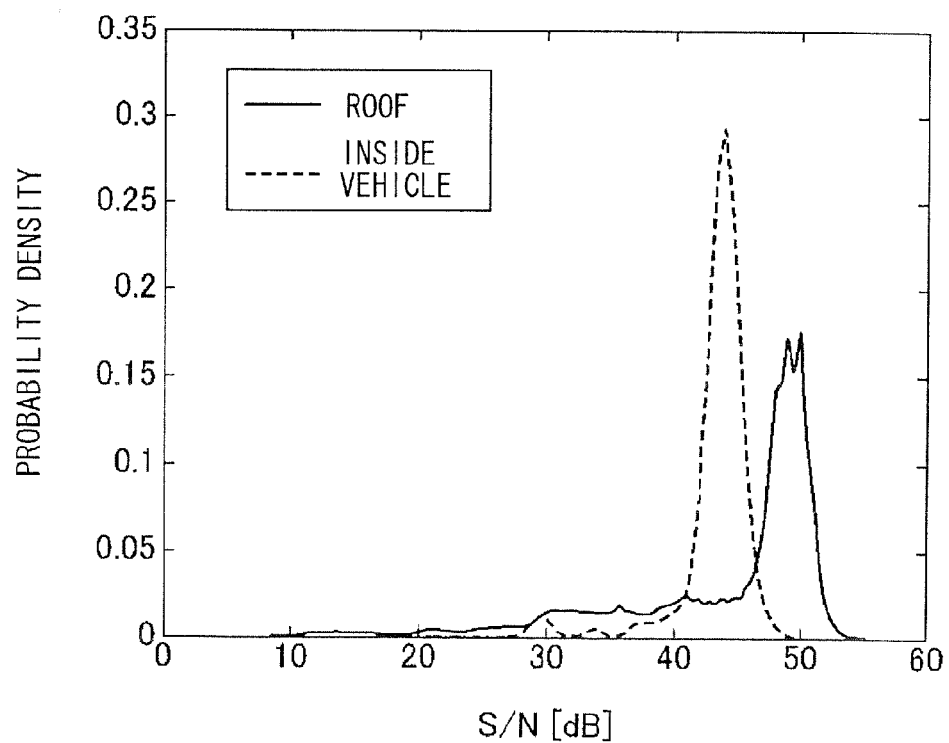
FIG. 7 is a diagram illustrating an S/N distribution in a partition.

This enables the difference in shielded state among the pillar, the window, etc. to be indicated by the S/N distribution according to every partition. For example, FIG. 7 illustrates an S/N distribution relative to the partition which covers an angle range between −120 and −90 with respect to the vehicle heading direction, the S/N distribution is for the same satellite as that of FIG. 3. The difference in the shielded state of each part of the vehicle body is separated in FIG. 7 unlike in above FIG. 3. The portion including the peak of the direct wave appears clearly.

Figure 8A:
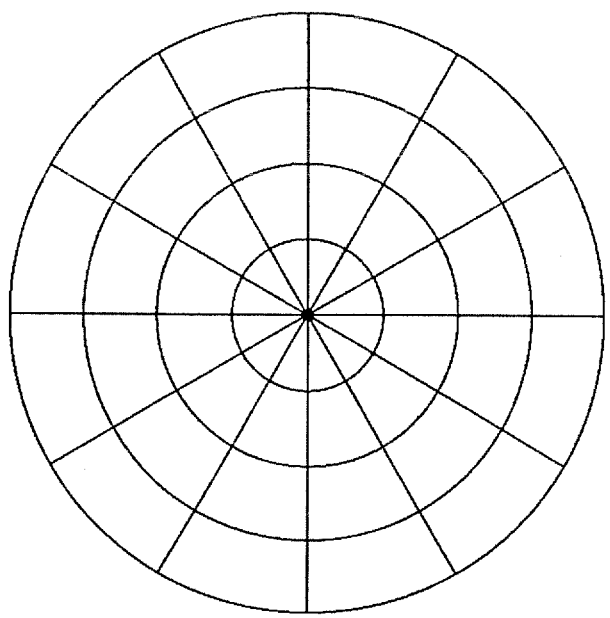
FIG. 8A is a diagram illustrating a division of dividing a three-dimensional sphere with predetermined angles with respect to a vehicle direction.

The method for dividing the three-dimensional sphere with respect to the heading direction of the subject vehicle may be as follows. For example, as illustrated in FIG. 8A, a predetermined value in an orientation angle and a predetermined value in an elevation angle may be used for the division.

Figure 8B:
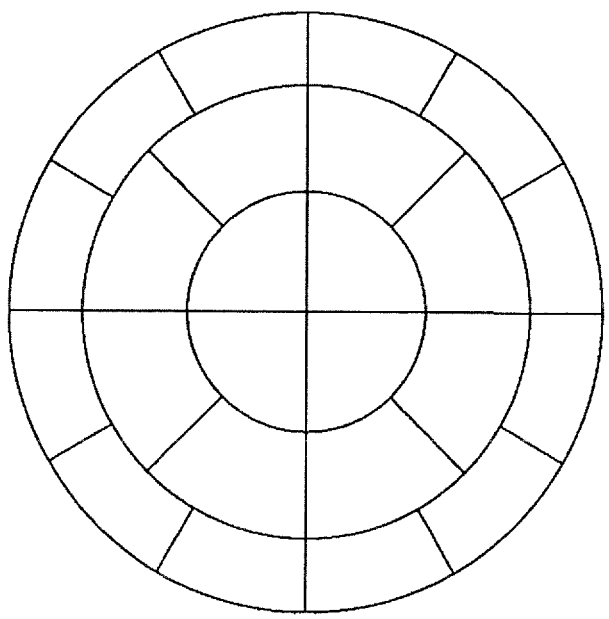
FIG. 8B is a diagram illustrating a division of dividing evenly a three-dimensional sphere with respect to a vehicle direction.

Alternatively, as illustrated in FIG. 8B, the division may be made such that the partitions have an equal or identical magnitude (i.e., area). The suitable threshold value relative to S/N is determined depending on the arrival direction of the electric wave (direct wave) of the positioning satellite. As shown in above FIG. 8B, it is desirable to divide the three-dimensional sphere into partitions as evenly as possible. In this case, the number of partitions (also referred to as a division number) can be reduced with the determination precision maintained. The learning of the S/N distributions can be effective.

The threshold determination section 36 determines, with respect to each partition, a threshold value relative to the S/N of the partition for distinguishing the direct wave and the indirect wave from each other based on the S/N distribution prepared for each partition as follows.

Figure 9A:
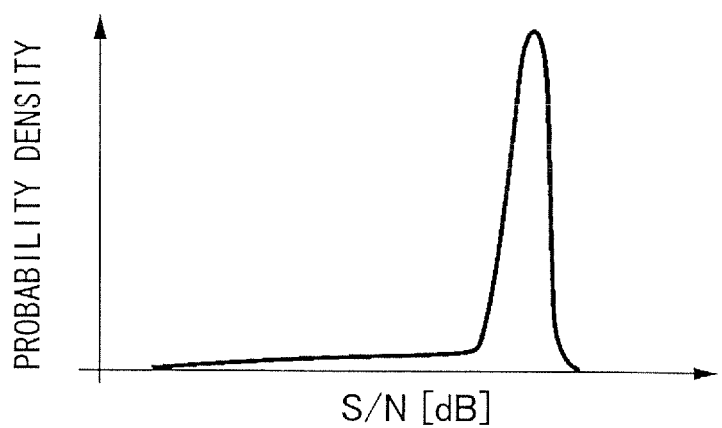
FIG. 9A is a diagram illustrating an S/N distribution in a partition.
Figure 9B:
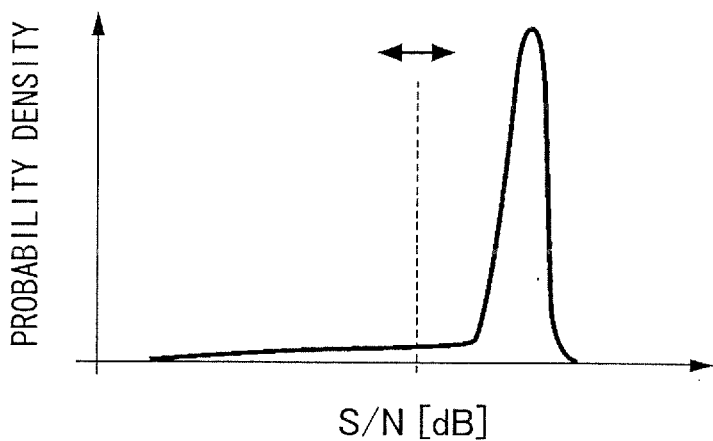
FIG. 9B is a diagram illustrating a designation of designating temporarily a threshold value relative to S/N.
Figure 9C:
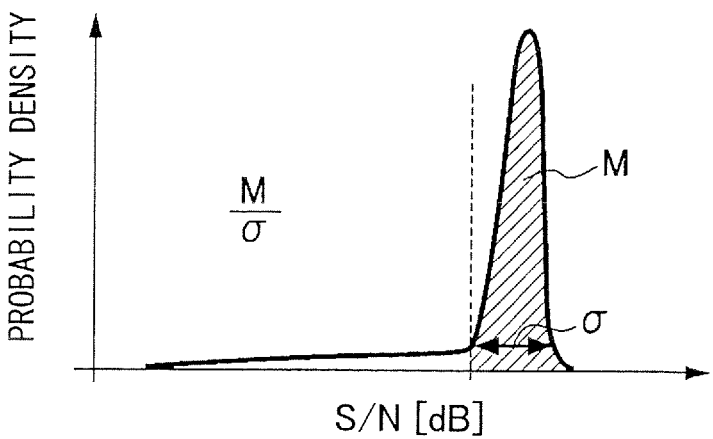
FIG. 9C is a diagram for explaining a numerical value which indicates a peakedness in an S/N distribution.

Suppose an S/N distribution as illustrated in FIG. 9A. A threshold value about S/N is temporarily designated while moving as illustrated in FIG. 9B. A numerical value (area M/width σ) is calculated which indicates the peakedness of the direct wave portion including a peak (the direct wave portion being a portion greater than the threshold value temporarily designated). Thereby, the threshold value is retrieved so as to maximize M/σ. As illustrated in FIG. 9C, the threshold value is determined such that the dispersion in the S/N distribution of the direct wave portion is small and its area becomes large. The above numerical value which indicates the peakedness is an example of a sharpness index.

The computer 18 further includes a shield determination section 38 and a subject vehicle position calculation section 40. The shield determination section 38 determines a shielded state or a non-shielded state with respect to each positioning satellite based on the S/N of the satellite signal acquired by the GPS information acquisition section 28. The subject vehicle position calculation section 40 calculates a position coordinate of the reception position based on the determination result of the shield determination section 38, and the pseudo distance and satellite position of each positioning satellite which are acquired by the GPS information acquisition section 28.

The shield determination section 38 considers, with respect to each positioning satellite, the S/N of the satellite signal acquired by the GPS information acquisition section 28, and the threshold value determined with respect to a target partition, which the relative direction of the positioning satellite (also referred to as a target positioning satellite) estimated by the satellite direction estimation section 32 belongs to, out of the several partitions. When the S/N of the satellite signal is greater than the threshold value, it is determined that the target positioning satellite is not shielded. In contrast, when the S/N of the satellite signal is not greater than the threshold value, it is determined that the target positioning satellite is shielded.

The subject vehicle position calculation section 40 precludes the positioning satellite that is determined to be shielded by the shield determination section 38 and then designates satellites combinations of four or more positioning satellites whose satellite signals are received. The subject vehicle position calculation section 40 calculates a position coordinate of the reception position as the subject vehicle position based on the pseudo distance and satellite position of each positioning satellite which are acquired by the GPS information acquisition section 28 with respect to the above designated satellites combination of four or more satellites other than the precluded satellite. The calculation method of the position coordinate of the reception position may adopt a conventional one; thus, a detail explanation is omitted.

Next, an operation of the in-vehicle positioning apparatus 10 according to the first embodiment will be explained.

Figure 10:
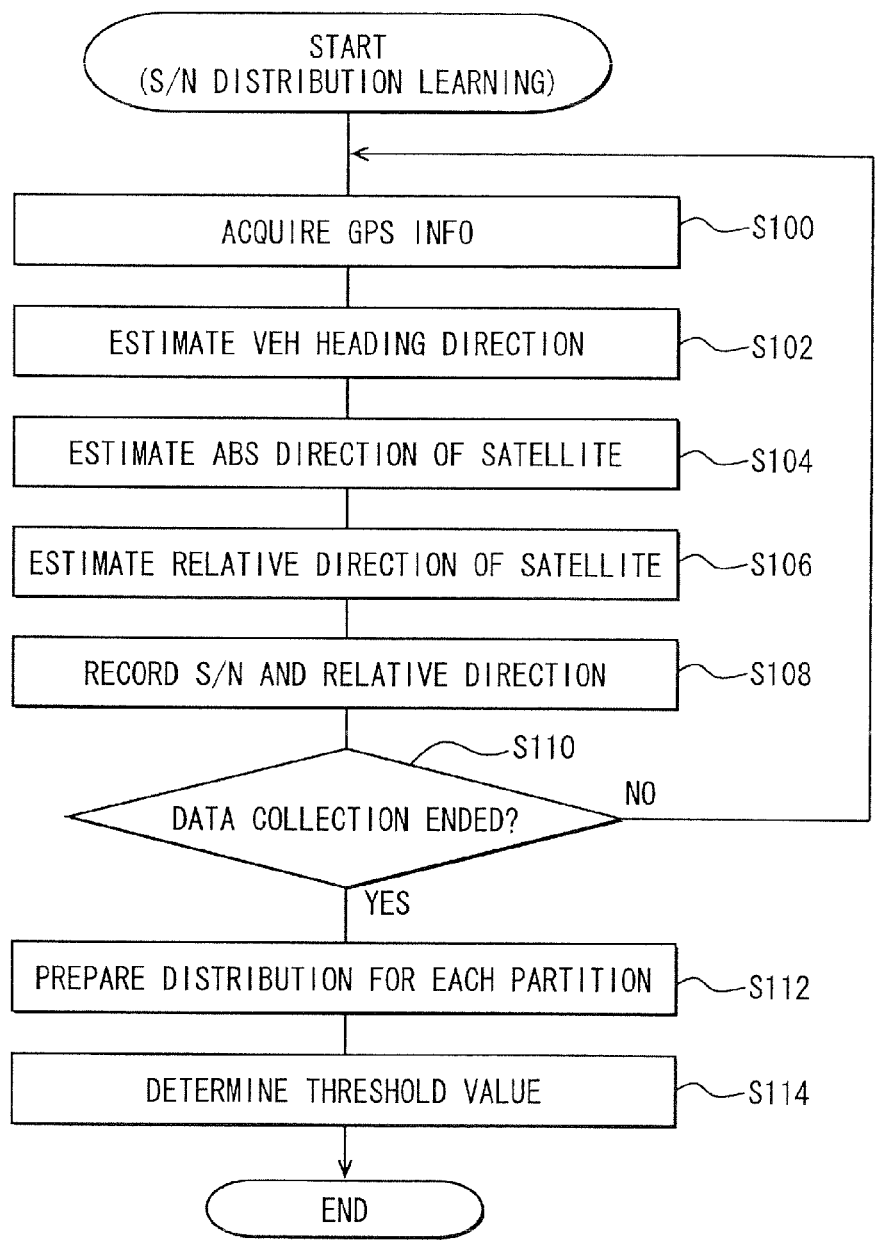
FIG. 10 is a flowchart diagram illustrating an S/N distribution learning process routine by a computer of the in-vehicle positioning apparatus according to the first embodiment.

The S/N distribution learning process routine in FIG. 10 is executed by the computer 18 when the reception portion 20 of the GPS receiver 12 receives electric waves from several positioning satellites.

It is further noted that a flowchart or the processing of the flowchart in the present application includes sections (also referred to as steps), which are represented, for instance, as S100. Further, each section can be divided into several subsections while several sections can be combined into a single section. Furthermore, each of thus configured sections can be referred to as a device, means, module, or processor and achieved not only as a software section in combination with a hardware device but also as a hardware section. Furthermore, the software section may be included in a software program, which may be contained in a non-transitory computer-readable storage media as a program product.

First, at S100, several GPS information items containing pseudo distance, Doppler shift frequency, satellite orbit information, S/N, satellite number, etc. outputted from the GPS receiver 12 are acquired. In addition, based on the acquired satellite orbit information, the satellite position is calculated with respect to each positioning satellite.

At S102, the absolute direction of the heading direction of the subject vehicle is estimated based on the Doppler shift frequency of each positioning satellite acquired at S100. At S104, the absolute direction of the existing position where each positioning satellite exists is estimated based on the satellite position of each positioning satellite calculated at S100. At S106, the relative direction of each positioning satellite is estimated based on the absolute direction of the heading direction of the subject vehicle estimated at S102 and the absolute direction of the existing position where each positioning satellite exists estimated at S104.

At S108, with respect to each positioning satellite, a combination of the S/N of the satellite signal of the positioning satellite acquired at S100, and the relative direction of the positioning satellite estimated at S106 is recorded in a memory (unshown).

At S110, it is determined whether the data collection is ended. For example, when the data number recorded at S108 does not reach a predetermined value, the processing returns to S100. In contrast, when the data number recorded reaches a predetermined value, it is determined that the data collection is ended. The processing then proceeds to S112.

At S112, the S/N corresponding to the relative direction of the positioning satellite belonging to each predetermined partition is collected, and the S/N distribution is prepared to indicate a probability density with respect to each S/N value.

At S114, the threshold value of S/N with respect to each partition is determined based on the S/N distribution of each spatial partition prepared at S112, and recorded in a memory (unshown). Then the S/N distribution learning process routine is ended.

Figure 11:
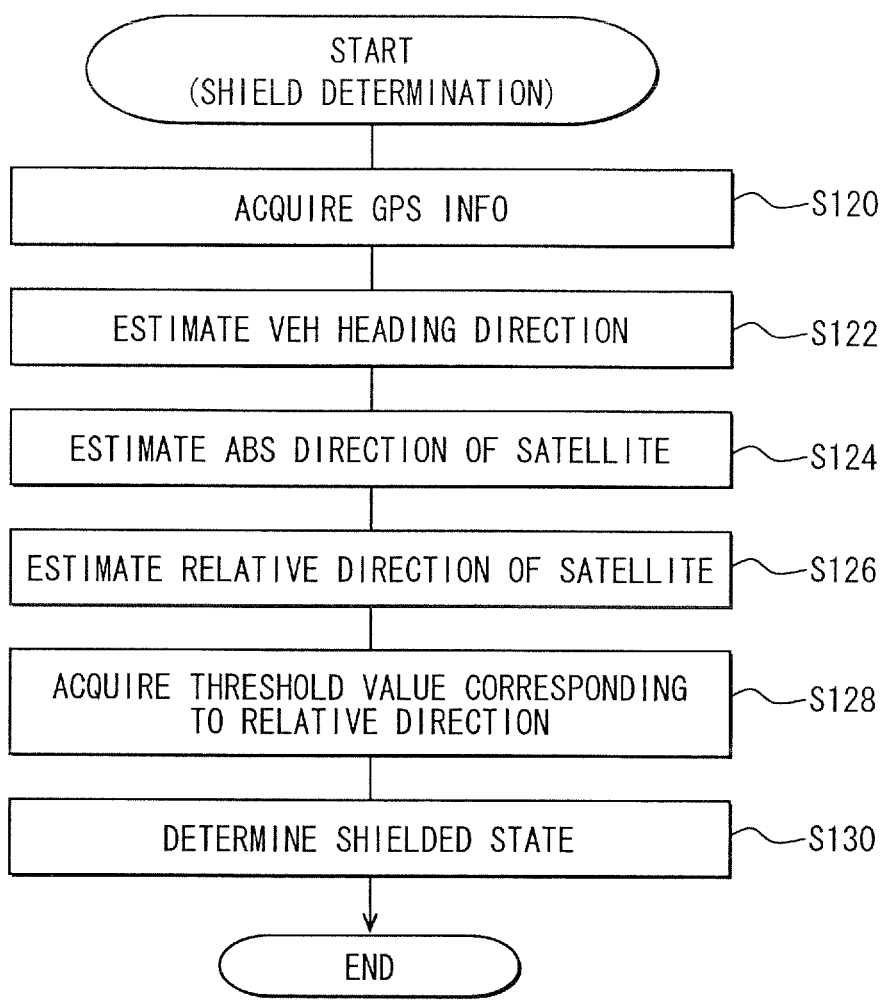
FIG. 11 is a flowchart diagram illustrating a shield determination process routine by a computer of the in-vehicle positioning apparatus according to the first embodiment.

Further, the shield determination process routine in FIG. 11 is executed by the computer 18 when the reception portion 20 of the GPS receiver 12 receives electric waves from several positioning satellites.

First, at S120, several GPS information items containing pseudo distance, Doppler shift frequency, satellite orbit information, S/N, satellite number, etc. outputted from the GPS receiver 12 are acquired. In addition, based on the acquired satellite orbit information, the satellite position is calculated with respect to each positioning satellite.

At S122, the absolute direction of the heading direction of the subject vehicle is estimated based on the Doppler shift frequency of each positioning satellite acquired at S120. At S124, the absolute direction of the existing position where each positioning satellite exists is estimated based on the satellite position of each positioning satellite calculated at S120. At S126, the relative direction of each positioning satellite is estimated based on the absolute direction of the heading direction of the subject vehicle estimated at S122 and the absolute direction of the existing position where each positioning satellite exists estimated at S124.

At S128, the threshold value corresponding to the (target) partition which belongs to the relative direction of the (target) positioning satellite estimated at S126 is acquired from the memory, with respect to each positioning satellite. At S130, with respect to each positioning satellite, the S/N of the satellite signal of the positioning satellite acquired at S120 and the threshold value acquired at S128 are compared to determine the shielded state of the (target) positioning satellite. Then the shield determination process routine is ended.

Then, in the above shield determination process routine, the computer 18 calculates a subject vehicle position using the pseudo distance and satellite position of each positioning satellite which are acquired about the satellites combinations of four or more positioning satellites which precludes the positioning satellite that is determined to be shielded, the four or more positioning satellite whose satellite signals are received.

As explained above, according to the in-vehicle positioning apparatus of the first embodiment, with respect to the partition to which the relative direction of the positioning satellite belongs, it is determined whether the S/N of the satellite signal transmitted from the positioning satellite is greater than the predetermined threshold value of S/N. Even if the GPS receiver is provided inside of the vehicle, the shielded state of the positioning satellite can be determined with sufficient accuracy based on S/N of the satellite signal.

In addition, the three-dimensional sphere in an arrival direction of a satellite signal of a satellite with respect to the subject vehicle is divided into several partitions in respect of an elevation angle as well as an orientation angle relative to the subject vehicle. The S/N distribution observed with respect to each partition is learned to thereby designate the threshold value of the S/N relative to each partition. The influence of the signal attenuation by the vehicle body or the vehicle pillar is cancelable.

Second Embodiment

The following describes a second embodiment of the present invention. The in-vehicle positioning apparatus according to the second embodiment has a configuration identical to that of the first embodiment; thus, the identical reference numbers are assigned to thereby omit the explanation thereof.

The second embodiment is mainly different from the first embodiment in that the division result of dividing three-dimensional sphere with respect of the heading direction of the subject vehicle is optimized.

In the second embodiment, the S/N distribution preparation section 34 accumulates the combination of the S/N of the satellite signal acquired by the GPS information acquisition section 28, and the relative direction of the positioning satellite estimated by the satellite direction estimation section 32. In addition, the S/N distribution preparation section 34 divides previously the three-dimensional sphere with respect to the heading direction of the subject vehicle into several partitions as explained below.

Figure 13:
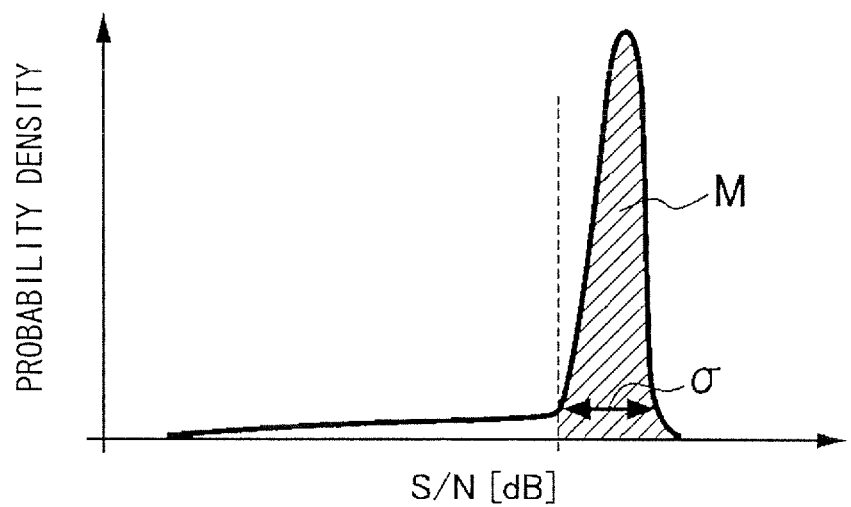
FIG. 13 is a diagram for explaining a numerical value which indicates a peakedness in an S/N distribution.

First, the division procedure is explained with reference to FIGS. 12A, 12B. The numerical value (area M/width a) which indicates a peakedness or sharpness index of the direct wave portion (peakedness portion) including the peak in the S/N distribution for each partition is calculated (refer to FIG. 13) in both of the case where a target three-dimensional sphere is not divided and the case where the same target three-dimensional sphere is divided into four partitions. When the average value of the numerical value(s) indicating the peakedness in the case where the division is not made is greater than that of the case where the division has been made, the three-dimensional sphere is divided into four partitions. In contrast, when the average value of the numerical value(s) indicating the peakedness in the case where the division is not made is equal to or less than that of the case where the division has been made, the three-dimensional sphere is not divided. Before calculating the numerical value indicating the peakedness, the threshold value of the S/N to each partition is determined based on the S/N distribution for each partition. The numerical value indicating the peakedness for each partition is calculated using the determined threshold value of S/N to each partition.

Then, as illustrated in FIG. 12C, the above division procedure is repeatedly executed with respect to the three-dimensional sphere until no change arises.

Next, the integration procedure is explained with reference to FIG. 12D where a target partition is integrated with a single adjacent partition. That is, the numerical value (area M/width σ) which indicates a peakedness of the direct wave portion (peakedness portion) including the peak in the S/N distribution for the integrated partition is calculated. When the calculated value is greater than the average values of the numerical values which indicate the peakedness of the direct wave portions about the partitions before the integration procedure, the target partition and the adjoining partition are integrated. Before calculating the numerical value which indicates the peakedness, the threshold value of the S/N to each partition is determined based on the S/N distribution for each partition. The numerical value which indicates the peakedness for each partition is calculated using the determined threshold value of S/N to each partition.

Then, as illustrated in FIG. 12E, the above integration procedure is repeatedly executed with respect to the partitions until no change arises.

Figure 14:
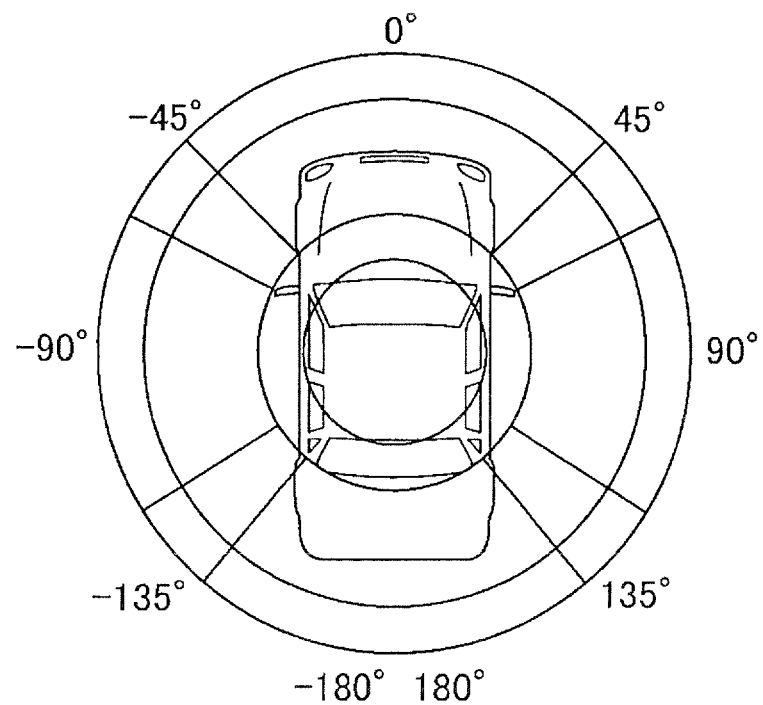
FIG. 14 is a diagram illustrating an optimal division of dividing a three-dimensional sphere with respect to a vehicle heading direction.

Under the above procedure, the three-dimensional sphere with respect to the heading direction of the subject vehicle is divided into several partitions. As illustrated in FIG. 14, the optimization is completed such that the division result of the three-dimensional sphere with respect to the heading direction of the subject vehicle provides the average value of the numerical values which indicates the peakedness of the direct wave portion of the S/N distribution of each partition as being maximum.

Figure 15:
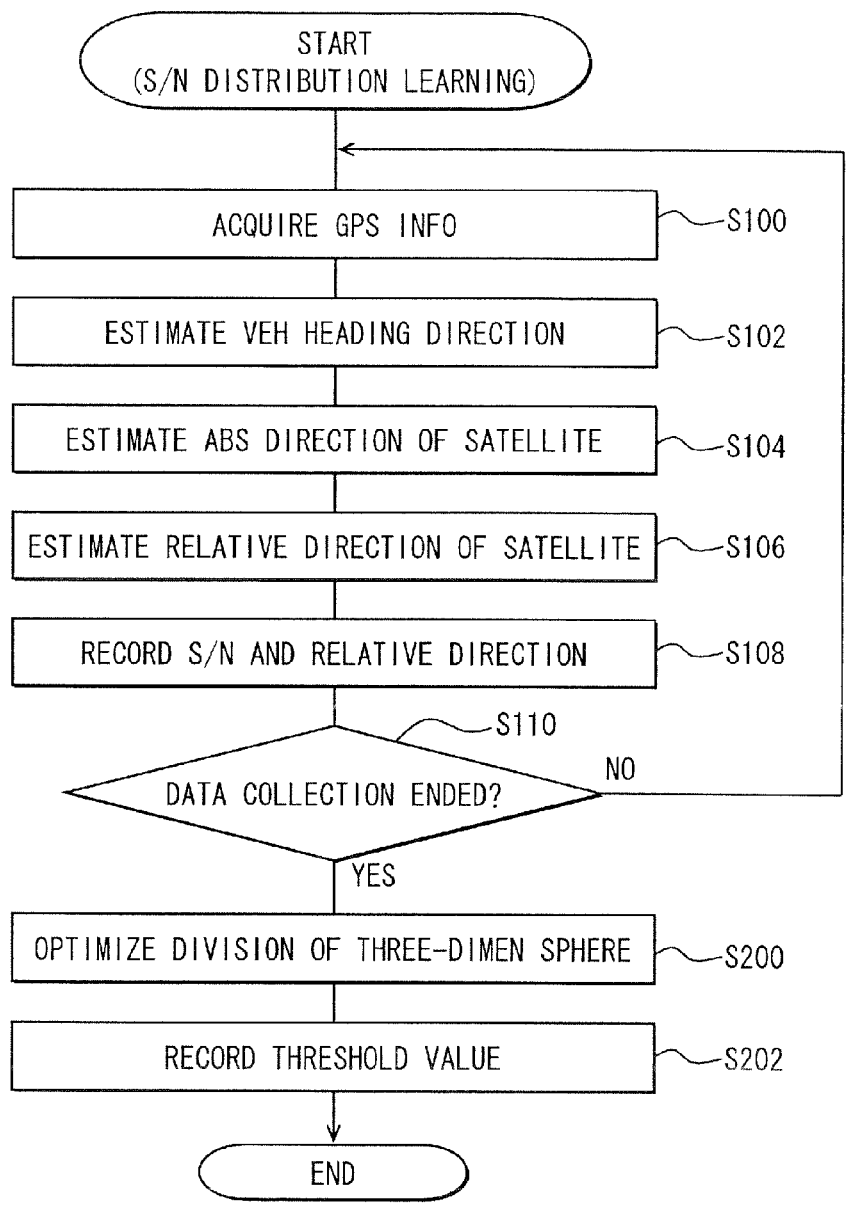
FIG. 15 is a flowchart diagram illustrating a shield determination process routine by a computer of the in-vehicle positioning apparatus according to a second embodiment of the present invention.

Next, the S/N distribution learning process routine according to the second embodiment is explained with reference to FIG. 15. The same processing as that of the first embodiment is assigned with the identical reference number and omitted from the explanation.

First, at S100, several GPS information items outputted from the GPS receiver 12 are acquired, and the satellite position is calculated with respect to each positioning satellite based on the acquired satellite orbit information. At S102, the absolute direction of the heading direction of the subject vehicle is estimated. At S104, the absolute direction of the existing position where each positioning satellite exists is estimated. At S106, the relative direction of each positioning satellite is estimated.

At S108, with respect to each positioning satellite, a combination of the S/N of the satellite signal of the positioning satellite acquired at S100, and the relative direction of the positioning satellite estimated at S106 is recorded in a memory (unshown).

At S110, it is determined whether the data collection is ended. When it is determined that the data collection is ended, the processing proceeds to S200.

At S200, the three-dimensional sphere with respect to the heading direction of the subject vehicle is divided into several partitions based on the data recorded at S108, such that the average value of the numerical values which indicate the peakedness of the direct wave portion of the S/N distribution of each partition exhibits maximum.

At S202, the threshold value of the S/N to each partition eventually obtained at S200 is acquired and stored in a memory (unshown). The S/N distribution learning process routine is then ended.

The in-vehicle positioning apparatus according to the second embodiment has another configuration and operation that are identical to those of the first embodiment; thus, the explanation thereof is omitted.

As explained above, according to the positioning apparatus of the second embodiment, the division of dividing the sphere of the satellite direction with respect to the subject vehicle is optimized so that the direct wave portion including the peak in the S/N distribution on each partition is conspicuous. The shielded state of the positioning satellite can be determined with more sufficient accuracy.

In the above embodiment, the division procedure and the integration procedure are undergone to optimize the division of dividing the sphere of the satellite direction with respect to the subject vehicle. Without need to be limited to the above, another may be adopted to optimize the division of the satellite direction with respect to the subject vehicle.

Third Embodiment

The following describes a third embodiment of the present invention. The in-vehicle positioning apparatus according to the third embodiment has a configuration identical to that of the first embodiment; thus, the identical reference numbers are assigned to thereby omit the explanation thereof.

The third embodiment is different from the first embodiment in respect of the method of determining the threshold value of S/N for distinguishing the direct wave and the indirect wave.

In the third embodiment, the threshold determination section 36 classifies the S/N distribution prepared for each partition into the direct wave portion (i.e., sub-distribution) and the indirect wave portion (i.e., sub-distribution) using the k-mean method, and determines the S/N corresponding to the boundary in between the two classifications or two sub-distributions as a threshold value about the S/N for distinguishing the direct wave and the indirect wave.

The in-vehicle positioning apparatus according to the third embodiment has another configuration and operation that are identical to those of the first embodiment; thus, the explanation thereof is omitted.

As explained above, according to the in-vehicle positioning apparatus of the third embodiment, the S/N distribution with respect to the partition is classified into the direct wave portion and the indirect wave portion, and the threshold value about S/N for distinguishing the direct wave and the indirect wave is determined. Thus, the shielded state of the positioning satellite can be determined with sufficient accuracy using the threshold value about this S/N.

In the above embodiment, the threshold value of S/N is determined using the classification method. Without need to be limited to the above, another may be adopted. For example, the curve of S/N distribution to the partition is subjected to the two successive differentiations to identify the start point of the direct wave portion including the peak in the S/N distribution. The S/N corresponding to the identified start point may be determined as a threshold value. Alternatively, the distribution of the direct wave may be expressed with a normal distribution while the distribution of the indirect wave may be expressed with a Rayleigh distribution. The distributed parameter may be learned with the EM algorithm, and the probability point of 50% may be obtained using the learned distribution. The threshold value may be thereby determined.

MODIFICATIONS

Further, in the above first to third embodiments, then absolute direction of the heading direction of the subject vehicle is estimated using the Doppler shift frequency, the vehicle velocity, and the yaw rate. Without need to be limited to the above, another may be adopted. For example, a peripheral image is captured by an in-vehicle camera. The landmark detected from the peripheral image is compared with the previously prepared map data which records positions of landmarks. The absolute direction of the heading direction of the subject vehicle may be estimated from the position of the landmark existing in the peripheral image.

Further, the absolute direction of the heading direction of the subject vehicle may be estimated using the direction outputted from a magnetic direction meter, and the vehicle velocity and yaw rate. In this case, the magnetic direction meter shakes in response to the influence of movement of the vehicle; the estimation may be made using an output that is smoothed through a low pass filter. In addition, the force applied to the magnetic direction meter is obtained from the detected vehicle velocity and yaw rate to thereby solve the equation of motion of the magnetic direction meter. Therefore, an accurate direction after removing the influence of the vehicle motion may be estimated.

Alternatively, the methods explained above may be combined to estimate the absolute direction of the heading direction of the subject vehicle. For example, the average of the results estimated by the several estimation methods may be obtained. The Kalman filter may be used in consideration of the error amounts of the estimated results of the several estimation methods, thereby integrating the estimated results.

In addition, the absolute direction of the heading direction of the subject vehicle may be estimated with another technique using a Doppler shift frequency. For instance, the absolute direction of the heading direction of the subject vehicle may be estimated using a conventional technology such as a description in Nonpatent document 3.

[Nonpatent document 3]: Integration of MEMS INS with GPS Carrier Phase Derived Velocity: A new approach, in Proceedings of ION GNSS 2007

In the above embodiment, the S/N distribution is prepared after the number of the stored data (combination of S/N and the relative direction) reaches a required data number. Without need to be limited to the above, another may be adopted. For example, only the S/N distribution curve and the data number N up to now may be held, without holding the data. In this case, when the new data enters, the gauss kernel on the center of the data is multiplied by 1/N and added to the S/N distribution curve, thereby obtaining a new S/N distribution curve.

Alternatively, the distribution of the direct wave may be expressed with a normal distribution whereas the distribution of the indirect wave may be expressed with a Rayleigh distribution. The maximum likelihood estimation may be applied to the distributed parameter using the data, thereby preparing the S/N distribution. In this case, when the new data belonging to a certain partition enters, whether the new data belongs to the distribution of the direct wave or the distribution of the indirect wave is determined using the S/N threshold value determined up to the previous time, thereby updating the S/N distribution of the partition. It is noted that when the S/N of the new data is close to the threshold value, the new data may be determined to belong to both the distributions. Next, the threshold value of S/N which distinguishes the direct wave over the indirect wave is determined for every S/N distribution of each partition. Thus, the update of the S/N distribution and the determination of the threshold value may be repeated alternately.

In the above embodiment, in the in-vehicle positioning apparatus, the S/N distribution is prepared and the threshold value is then determined. Without need to be limited to the above, another may be adopted. For example, when the in-vehicle positioning apparatus is installed in a predetermined position of the vehicle body whose model is predetermined, the S/N distribution may be prepared using another in-vehicle positioning apparatus installed in the identical position of another vehicle of the identical model. Thereby, the threshold value may be determined. In this case, the predetermined threshold value may be designated at the time of manufacturing an in-vehicle positioning apparatus, for example, and the in-vehicle positioning apparatus may be also arranged at the predetermined position. In addition, by using another in-vehicle positioning apparatus installed in the same position of the body of the vehicle of the identical model, the optimal division of the three-dimensional sphere with respect to the direction of the vehicle may be executed and the threshold value may be determined for each partition.

It will be obvious to those skilled in the art that various changes may be made in the above-described embodiments of the present invention. However, the scope of the present invention should be determined by the following claims.

What is claimed:

1. A satellite signal determination apparatus for a moving vehicle, the apparatus comprising:
    a GPS receiver provided inside of the vehicle to receive satellite signals transmitted from a plurality of satellites for positioning;
    a vehicle direction estimation section that estimates an absolute direction of a heading direction of the vehicle based on (i) GPS information outputted from the GPS receiver based on the satellite signals transmitted from the plurality of satellites, or (ii) vehicle information of the vehicle detected by a detection section;
    a satellite direction estimation section that estimates an absolute direction of an existing position of a target satellite, which is one of the plurality of satellites, using the GPS information outputted from the GPS receiver based on the satellite signal from the target satellite;
    a relative direction calculation section that calculates a relative direction of the target satellite with respect to the heading direction of the vehicle based on (i) the absolute direction of the heading direction of the vehicle estimated by the vehicle direction estimation section, and (ii) the absolute direction of the target satellite estimated by the satellite direction estimation section; and
    a shield determination section that determines a shielded state of the target satellite by determining whether a signal strength of a satellite signal transmitted from the target satellite is greater than a predetermined threshold value relative to a target partition within a plurality of partitions into which a three-dimensional sphere with respect to the heading direction of the vehicle is divided, the target partition which the relative direction of the target satellite calculated by the relative direction calculation section belongs to.

2. The satellite signal determination apparatus according to claim 1, wherein
    the three-dimensional sphere with respect to the heading direction of the vehicle is divided into the plurality of partitions such that an average value of sharpness indices of signal strength distributions, which are obtained with respect to the plurality of partitions, becomes maximum, the sharpness index of the signal strength indicating a sharpness of a portion including a peak in the signal strength distribution.

3. The satellite signal determination apparatus according to claim 1, wherein
    the three-dimensional sphere with respect to the heading direction of the vehicle is divided into the plurality of partitions such that each of the partitions has an even magnitude.

4. The satellite signal determination apparatus according to claim 1, further comprising:
    a division section that divides the three-dimensional sphere with respect to the heading direction of the vehicle into the plurality of partitions such that an average value of sharpness indices of signal strength distributions, which are obtained with respect to the plurality of partitions, becomes maximum, based on (i) a signal strength of a satellite signal transmitted from each of the satellites and (ii) the relative direction of each satellite calculated by the relative direction calculation section, the sharpness index of the signal strength indicating a sharpness of a portion including a peak in the signal strength distribution,
    wherein the determination section determines the shielded state of the target satellite using the predetermined threshold value relative to the target partition of the plurality of partitions, the target partition which the relative direction of the target satellite calculated by the relative direction calculation section belongs to.

5. The satellite signal determination apparatus according to claim 1, wherein
    the predetermined threshold value relative to the target partition is determined based on a portion which includes a peak in the signal strength distribution obtained with respect to the target partition.

6. The satellite signal determination apparatus according to claim 1, wherein
    the predetermined threshold value relative to the target partition is a signal strength corresponding to a boundary between two sub-distributions into which the signal strength distribution is classified.

7. A program product stored in a non-transitory computer readable storage medium comprising instructions for execution by a computer included in the satellite signal determination apparatus according to claim 1,
    the instructions causing the computer to function as:
    the vehicle direction estimation section;
    the satellite direction estimation section;
    the relative direction calculation section; and
    the shield determination section,
    all of which are included in the satellite signal determination apparatus according to claim 1.

8. A method for determining a shied state of one of a plurality of satellites for positioning in a moving vehicle with a GPS receiver provided inside of the vehicle to receive satellite signals transmitted from the plurality of satellites, the method being executed by a computer,
    the method comprising:
    estimating an absolute direction of a heading direction of the vehicle based on (i) GPS information outputted from the GPS receiver based on the satellite signals transmitted from the plurality of satellites or (ii) vehicle information of the vehicle;
    estimating an absolute direction of an existing position of a target satellite, which is one of the plurality of satellites, using the GPS information outputted from the GPS receiver based on the satellite signal from the target satellite;
    calculating a relative direction of the target satellite with respect to the heading direction of the vehicle based on (i) the estimated absolute direction of the heading direction of the vehicle and (ii) the estimated absolute direction of the target satellite; and determining a shielded state of the target satellite by determining whether a signal strength of a satellite signal transmitted from the target satellite is greater than a predetermined threshold value relative to a target partition within a plurality of partitions into which a three-dimensional sphere with respect to the heading direction of the vehicle is divided, the target partition which the calculated relative direction of the target satellite belongs to.

9. A non-transitory computer readable storage medium comprising instructions for execution by a computer, the instructions including the method according to claim 8, which is computer-implemented.

* * * * *